US010734903B2

(12) United States Patent
Toyoda

(10) Patent No.: US 10,734,903 B2
(45) Date of Patent: Aug. 4, 2020

(54) POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 16/604,277

(22) PCT Filed: Apr. 25, 2017

(86) PCT No.: PCT/JP2017/016350
§ 371 (c)(1),
(2) Date: Oct. 10, 2019

(87) PCT Pub. No.: WO2018/198190
PCT Pub. Date: Nov. 1, 2018

(65) Prior Publication Data
US 2020/0044566 A1 Feb. 6, 2020

(51) Int. Cl.
H02M 3/158 (2006.01)
H02J 9/06 (2006.01)
H02M 1/00 (2006.01)
H02M 7/219 (2006.01)

(52) U.S. Cl.
CPC .......... H02M 3/1582 (2013.01); H02J 9/061 (2013.01); H02M 1/00 (2013.01); H02M 7/219 (2013.01); H02M 2001/0009 (2013.01); H02M 2001/0054 (2013.01)

(58) Field of Classification Search
CPC .............. H02M 3/1582; H02M 1/00; H02M 2001/0009; H02M 2001/0054; H02M 2001/0032; H02M 3/28
See application file for complete search history.

(56) References Cited

U.S. PATENT DOCUMENTS

| 6,795,322 | B2 | 9/2004 | Aihara et al. |
| 7,053,502 | B2 | 5/2006 | Aihara et al. |
| 2002/0071292 | A1 | 6/2002 | Aihara et al. |
| 2003/0048651 | A1* | 3/2003 | Trimble .............. H02M 7/2173 363/125 |
| 2005/0078494 | A1 | 4/2005 | Aihara et al. |

FOREIGN PATENT DOCUMENTS

JP 2000-197347 A 7/2000

OTHER PUBLICATIONS

International Search Report dated Jun. 20, 2017 in PCT/JP2017/016350 filed on Apr. 25, 2017.

* cited by examiner

Primary Examiner — Adolf D Berhane
Assistant Examiner — Afework S Demisse
(74) Attorney, Agent, or Firm — Oblon, McClelland, Maier & Neustadt, L.L.P.

(57) ABSTRACT

An uninterruptible power supply apparatus (1) drives a converter (6) at a relatively high frequency (fH) and supplies an output voltage (VDC) of the converter (6) directly to a load (23) when a load current (IL) is greater than a predetermined value (Ic), and drives the converter (6) at a relatively low frequency (fL), steps up the output voltage (VDC) of the converter (6) by a bidirectional chopper (11), and supplies the output voltage (VDC) of the converter (6) to the load (23) when the load current (IL) is smaller than the predetermined value (Ic).

7 Claims, 9 Drawing Sheets

US 10,734,903 B2

POWER SUPPLY APPARATUS

TECHNICAL FIELD

The present invention relates to power supply apparatuses, and particularly, to a power supply apparatus that includes a converter and a bidirectional chopper and supplies DC power to a load.

BACKGROUND ART

For example, Japanese Patent Laying-Open No. 2000-197347 (PTL 1) discloses a power supply apparatus including an AC/DC converter, a bidirectional chopper, and a DC/DC converter. The AC/DC converter includes a plurality of switching elements and a plurality of diodes each of which is connected in anti-parallel with a corresponding one of the plurality of switching elements.

During normal operation in which AC power is supplied from the AC power supply, the AC power from the AC power supply is converted to DC power by the AC/DC converter, and the DC power is supplied through the DC/DC converter to a load and is also stored through the bidirectional chopper in a power storage apparatus. During a power failure in which a supply of the AC power from the AC power supply is stopped, the DC power of the power storage apparatus is supplied to the load through the bidirectional chopper and the DC/DC converter.

CITATION LIST

Patent Literature

PTL 1: Japanese Patent Laying-Open No. 2000-197347

SUMMARY OF INVENTION

Technical Problem

A conventional power supply apparatus, however, suffers from reduced efficiency due to switching losses occurring in the switching elements and reverse recovery losses occurring in the diodes every time the switching elements are turned on and off.

A main object of the present invention is therefore to provide a high-efficiency power supply apparatus.

Solution to Problem

A power supply apparatus according to the present invention is a power supply apparatus that performs an operation mode selected from a first operation mode and a second operation mode. The power supply apparatus includes an output terminal, a converter, a bidirectional chopper, a switch circuit, a first controller, and a second controller. The output terminal is provided for supplying DC power to a load. The converter is configured to convert AC power to DC power and output the DC power to a first node. The bidirectional chopper is configured to during the first operation mode, step down a DC voltage of the output terminal and output the DC voltage to a second node, and during the second operation mode, step up the DC voltage of the second node and output the DC voltage to the output terminal. The switch circuit is configured to during the first operation mode, connect the first node to the output terminal and connect the second node to a power storage apparatus, and during the second operation mode, connect the first node to the second node. The first controller is configured to during the first operation mode, control the converter such that a DC voltage of the first node attains to a first reference voltage, and during the second operation mode, control the converter such that the DC voltage of the first node attains to a second reference voltage lower than the first reference voltage. The second controller is configured to during the first operation mode, control the bidirectional chopper such that the DC voltage of the second node attains to the second reference voltage, and during the second operation mode, control the bidirectional chopper such that the DC voltage of the output terminal attains to the first reference voltage.

Advantageous Effects of Invention

In the power supply apparatus according to the present invention, during the first operation mode, an output voltage of the converter is supplied directly to the output terminal, and also, the output voltage of the converter is stepped down by the bidirectional chopper and supplied to the power storage apparatus. During the second operation mode, the output voltage of the converter is stepped up by the bidirectional chopper and supplied to the output terminal. During the second operation mode, thus, the output voltage of the converter can be reduced to reduce a loss occurring in the converter, thereby increasing the efficiency of the power supply apparatus.

DESCRIPTION OF EMBODIMENTS

Embodiment 1

Figure 6:
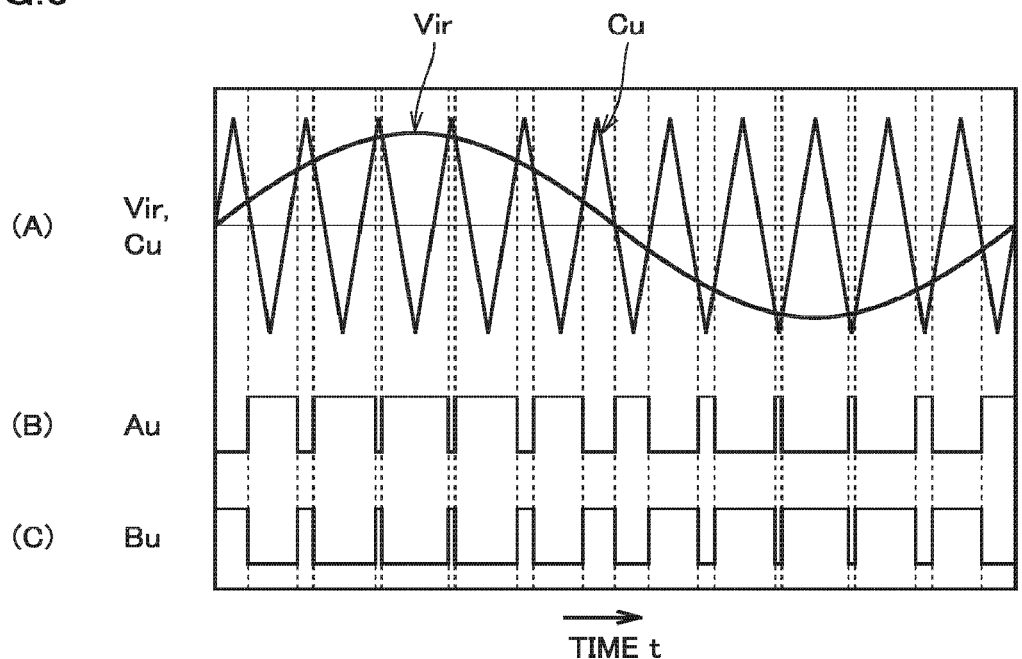
FIG. 6 is a time chart illustrating waveforms of a voltage command value, a triangular wave signal, and a gate signal shown in FIG. 5.

For easy understanding of the invention of the present application, the principle of the invention of the present application will be described before describing Embodiment 1. When a converter 6 (FIG. 6) is driven, switching losses occur in IGBTs Q1 to Q6, and reverse recovery losses occur in diodes D1 to D6. The losses occurring in IGBTs Q1 to Q6 and diodes D1 to D6 increase in proportion to the product of switching frequencies (the number of ones and offs per second) of IGBTs Q1 to Q6, an output voltage VDC of converter 6, and an output current of converter 6.

In order to reduce a loss occurring in converter 6, thus, the product of the switching frequencies of IGBTs Q1 to Q6, the output voltage of converter 6, and the output current of converter 6 needs to be reduced.

At a large load current IL, it is required to set the switching frequencies of IGBTs Q1 to Q6 to a sufficiently high frequency fH (first frequency) and keep output voltage VDC of converter 6 at a rated voltage (reference voltage VR1) of load 23, and also to cause converter 6 to output a large load current IL.

At a small load current IL, contrastingly, the switching frequency of IGBTs Q1 to Q6 can be set to a frequency fL (second frequency) lower than frequency fH. Also, output voltage VDC of converter 6 can be lowered by stepping up output voltage VDC of converter 6 by a bidirectional chopper 11 and supplying output voltage VDC to load 23.

In the invention of the present application, thus, when load current IL is greater than a predetermined value Ic, converter 6 is driven at a relatively high frequency fH, and output voltage VDC of converter 6 is supplied directly to load 23, thereby stably driving load 23. Contrastingly, when load current IL is smaller than predetermined value Ic, converter 6 is driven at a relatively low frequency fL, and output voltage VDC of converter 6 is stepped up by bidirectional chopper 11 and supplied to load 23 to reduce a loss occurring in converter 6, thereby increasing the efficiency of uninterruptible power supply apparatus 1.

Compared with converter 6, bidirectional chopper 11 has few switching elements, which are caused to perform a switching operation during driving, and can set the switching frequency to a low frequency. This results in a loss occurring in bidirectional chopper 11 much smaller than a loss occurring in converter 6. When load current IL is smaller than predetermined value Ic, thus, an amount of decrease in the loss occurring in converter 6 exceeds a loss occurring in bidirectional chopper 11, thereby reducing a loss occurring as uninterruptible power supply apparatus 1 as a whole.

Hereinafter, uninterruptible power supply apparatus 1 to which the invention of the present application is applied will be described in detail with reference to the drawings.

Figure 1:
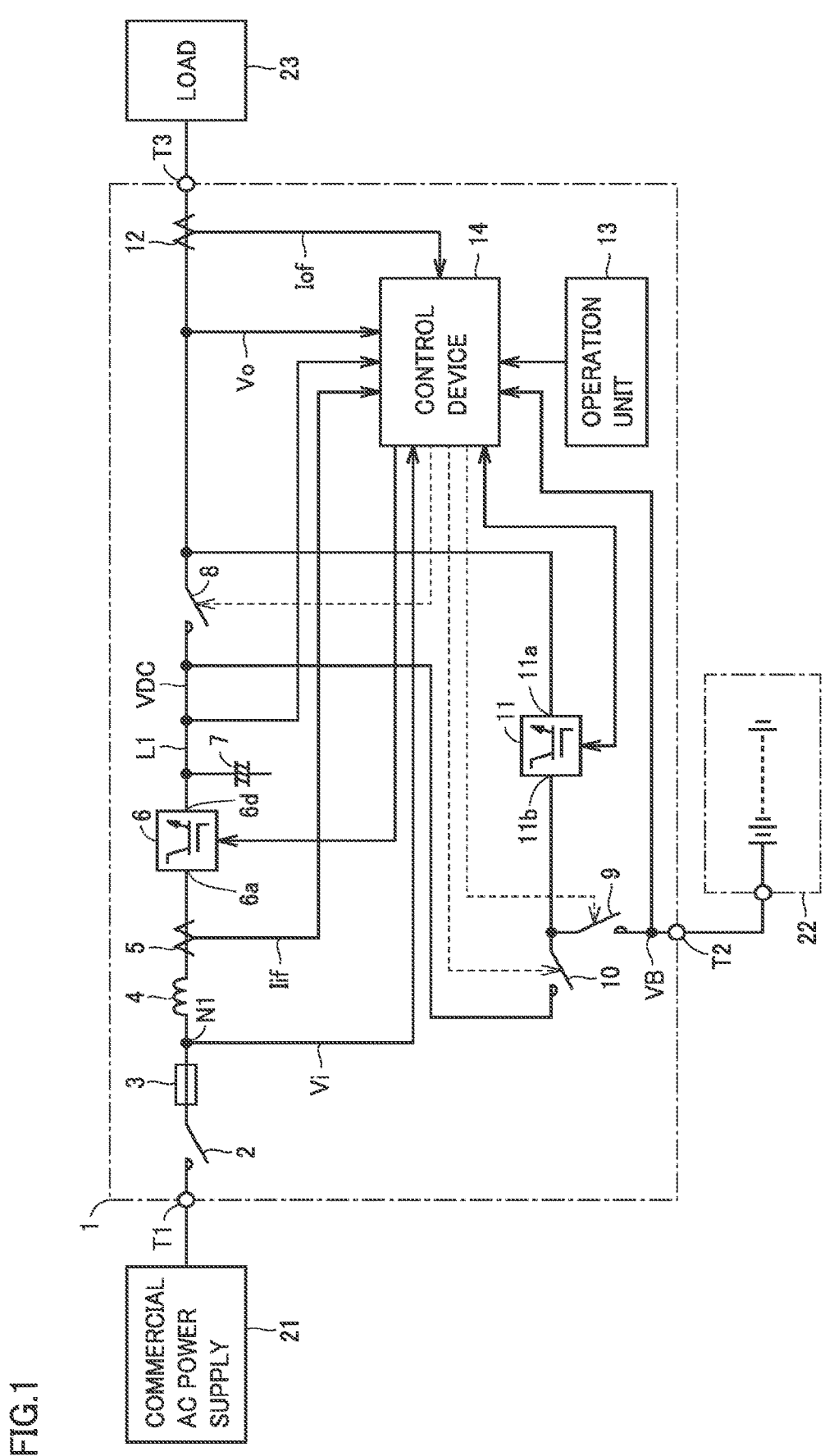
FIG. 1 is a circuit block diagram showing a general configuration of an uninterruptible power supply apparatus according to Embodiment 1 of the present invention.

FIG. 1 is a circuit block diagram showing a configuration of uninterruptible power supply apparatus 1 according to Embodiment 1 of the present invention. Uninterruptible power supply apparatus 1 converts three-phase AC power from a commercial AC power supply 21 to DC power and supplies the DC power to a load 23. For simplification of the drawing and the description, FIG. 1 shows only a part corresponding to one phase (e.g., U-phase) among three phases (U-phase, V-phase, W-phase) and a part of a DC voltage which corresponds to a positive voltage.

With reference to FIG. 1, uninterruptible power supply apparatus 1 includes an AC input terminal T1, a battery terminal T2, and a DC output terminal T3. AC input terminal T1 receives AC power of a commercial frequency from commercial AC power supply 21. Battery terminal T2 is connected to a battery (power storage apparatus) 22. Battery 22 stores DC power. A capacitor may be connected in place of battery 22. DC output terminal T3 is connected to load 23. Load 23 is driven by DC power.

Uninterruptible power supply apparatus 1 further includes electromagnetic contactors 2, 8, 9, and 10, a fuse 3, a reactor 4, current detectors 5 and 12, a converter 6, a bidirectional chopper 11, an operation unit 13, and a control device 14.

Electromagnetic contactor 2, fuse 3, and reactor 5 are connected in series between AC input terminal T1 and an input node 6a of converter 6. Electromagnetic contactor 2 is turned on during use of uninterruptible power supply apparatus 1 and is turned off during, for example, maintenance of uninterruptible power supply apparatus 1. Fuse 3 is blown when an overcurrent flows, thereby protecting uninterruptible power supply apparatus 1. An instantaneous value of an AC input voltage Vi which appears at a node N1 between fuse 3 and reactor 4 is detected by control device 14. For example, the presence or absence of a power failure is determined based on the instantaneous value of AC input voltage Vi.

Reactor 4 forms a low pass filter, passes AC power of commercial frequency from commercial AC power supply 21 to converter 6, and restricts the passage of a signal of a switching frequency, which is generated in converter 6, through commercial AC power supply 21. Current detector 5 detects an AC input current Ii flowing between reactor 4 and input node 6a of converter 6, and provides control device 14 with a signal Iif indicating a detection value thereof.

An output node 6d (first node) of converter 6 is connected to a first terminal of electromagnetic contactor 8 through a DC line L1. Capacitor 7 is connected to DC line L1 and smoothes a voltage VDC of DC line L1. An instantaneous value of DC voltage (i.e., an output DC voltage of converter 6) VDC appearing in DC line L1 is detected by control device 14.

A second terminal of electromagnetic contactor 8 is connected to DC output terminal T3 and is also connected to a high-voltage-side node 11a of bidirectional chopper 11. A low-voltage-side node 11b (second node) of bidirectional chopper 11 is connected to battery terminal T2 through electromagnetic contactor 9 and is also connected to DC line L1 through electromagnetic contactor 10. Each of electromagnetic contactors 8, 9, and 10 is controlled by control device 14.

Uninterruptible power supply apparatus 1 performs an operation mode selected from a normal operation mode (first operation mode) and a power saving operation mode (second operation mode). The normal operation mode, the power saving operation mode, and a method of selecting from these operation modes will be described below.

Electromagnetic contactor 8 is turned on during the normal operation mode and is turned off during the power saving operation mode. An instantaneous value of a DC voltage (i.e., an output DC voltage of uninterruptible power supply apparatus 1) Vo appearing at the second terminal of electromagnetic contactor 8 is detected by control device 14.

Electromagnetic contactor 9 is turned on during the normal operation mode. When the normal operation mode is switched to the power saving operation mode, electromagnetic contactor 9 is turned off once, and after output DC voltage VDC of converter 6 decreases from a reference voltage VR1 (a rated voltage of load 23) to a reference voltage VR2 (a rated voltage of battery 22), electromagnetic contactor 9 is turned on again. An instantaneous value of a DC voltage (i.e., a voltage between terminals of battery 22) VB appearing at battery terminal T2 is detected by control device 14.

Electromagnetic contactor 10 is turned off when the normal operation mode is selected and is turned on when the power saving operation mode is selected during normal operation in which AC power is supplied from commercial AC power supply 21. Electromagnetic contactor 10 is turned off when either operation mode of the normal operation mode and the power saving operation mode is selected during a power failure in which a supply of the AC power from commercial AC power supply 21 is stopped.

Converter 6 is controlled by control device 14, and during normal operation in which AC power is supplied from commercial AC power supply 21, converts AC power to DC power and outputs the DC power to DC line L1. During a power failure in which a supply of the AC power from commercial AC power supply 21 is stopped, the operation of converter 6 is stopped.

When the normal operation mode is selected during normal operation in which AC power is supplied from commercial AC power supply 21, the DC power generated by converter 6 is supplied to load 23 through electromagnetic contactor 8. At this time, converter 6 is controlled such that output DC voltage VDC attains to reference voltage VR1 (the rated voltage of load 23).

When the power saving operation mode is selected during normal operation in which AC power is supplied from commercial AC power supply 21, the DC power generated by converter 6 is supplied through electromagnetic contactor 10 and bidirectional chopper 11 to load 23 and is also supplied through electromagnetic contactors 10 and 9 to battery 22. At this time, converter 6 is controlled such that output voltage VDC attains to reference voltage VR2 (the rated voltage of battery 22). Reference voltage VR1 (e.g., 750 V) is higher than reference voltage VR2 (e.g., 500 V).

During a power failure in which a supply of the AC power from commercial AC power supply 21 is stopped, the operation of converter 6 is stopped when either operation mode of the normal operation mode and the power saving operation mode is selected.

Bidirectional chopper 11 is controlled by control device 14. When the normal operation mode is selected during normal operation in which AC power is supplied from commercial AC power supply 21, bidirectional chopper 11 supplies the DC power generated by converter 6 to battery 22 through electromagnetic contactor 9. At this time, bidirectional chopper 11 steps down a DC voltage of high-voltage-side node 11a (output DC voltage VDC of converter 6) and outputs the DC voltage to low-voltage-side node 11b, and is controlled such that battery voltage VB attains to reference voltage VR2 (the rated voltage of battery 22).

When the power saving operation mode is selected during normal operation in which AC power is supplied from commercial AC power supply 21, bidirectional chopper 11 supplies DC power, provided from converter 6 thereto through electromagnetic contactor 10, to load 23. At this time, bidirectional chopper 11 steps up the DC voltage of low-voltage-side node 11b (output DC voltage VDC of converter 6=VR2) and outputs the DC voltage to high-voltage-side node 11a, and is controlled such that a DC voltage Vo of DC output terminal T3 attains to reference voltage VR1 (the rated voltage of load 23).

During a power failure in which a supply of the AC power from commercial AC power supply 21 is stopped, bidirectional chopper 11 supplies DC power, provided from battery 22 thereto through electromagnetic contactor 9, to load 23 when either operation mode of the normal operation mode and the power saving operation mode is selected. At this time, bidirectional chopper 11 steps up the DC voltage (battery voltage VB=VR2) of low-voltage-side node 11b and outputs the DC voltage to high-voltage-side node 11a, and is controlled such that DC voltage Vo of DC output terminal T3 attains to reference voltage VR1 (the rated voltage of load 23).

Current detector 12 detects an instantaneous value of an output current Io (i.e., load current IL) of uninterruptible power supply apparatus 1 and provides control device 14 with a signal Iof indicating a detection value thereof. Operation unit 13 includes a plurality of buttons operated by a user of uninterruptible power supply apparatus 1, an image display unit that displays various pieces of information, and the like. As the user operates operation unit 13, the power of uninterruptible power supply apparatus 1 can be turned on and off, and uninterruptible power supply apparatus 1 can be operated automatically or manually.

Control device 14 controls the overall uninterruptible power supply apparatus 1 based on, for example, a signal from operation unit 13, AC input voltage Vi, AC input current Ii, DC voltage VDC, DC output voltage Vo, battery voltage VB, and DC output current Io. In other words, control device 14 detects whether a power failure has occurred based on a detection value of AC input voltage Vi and controls converter 6 in synchronization with the phase of AC input voltage Vi.

Further, control device 14 determines whether output current Io (i.e., load current IL) is greater than predetermined value Ic based on output signal Iof of current detector 12, and selects the normal operation mode when output current Io is greater than predetermined value Ic and selects the power saving operation mode when output current Io is smaller than predetermined value Ic. Control device 14 then performs the selected mode. Output current Io being smaller than predetermined value Ic means that load 23 is a light load or load 23 is in a standby state.

Further, when the normal operation mode is selected during normal operation in which AC power is supplied from commercial AC power supply 21, control device 14 turns on electromagnetic contactors 8 and 9, turns off electromagnetic contactor 10, and controls converter 6 such that DC voltage VDC attains to reference voltage VR1 and controls bidirectional chopper 11 such that battery voltage VB attains to reference voltage VR2.

Further, when the power saving operation mode is selected during normal operation in which AC power is supplied from commercial AC power supply 21, control device 14 turns off electromagnetic contactors 8 and 9, turns on electromagnetic contactor 10, controls converter 6 such that DC voltage VDC attains to reference voltage VR2, and controls bidirectional chopper 11 such that output voltage Vo attains to reference voltage VR1. After DC voltage VDC attains to reference voltage VR2, control device 14 turns on electromagnetic contactor 9, and causes battery 22 to charge converter 6.

Further, during a power failure in which a supply of the AC power from commercial AC power supply 21 is stopped, control device 14 stops the operation of converter 6, turns off electromagnetic contactor 10, turns on electromagnetic contactor 9, and controls bidirectional chopper 11 such that output voltage Vo attains to reference voltage VR1.

When the normal operation mode is selected, control device 14 compares the levels of a sinusoidal signal of a commercial frequency and a triangular wave signal of a frequency fH much higher than the commercial frequency, and based on a result of the comparison, generates a gate signal (control signal) for controlling converter 6. In the normal operation mode, the gate signal is a pulse signal sequence having a frequency of a value corresponding to frequency fH of the triangular wave signal. The pulse width of the gate signal is controlled such that output DC voltage VDC of converter 6 attains to reference voltage VR1.

When the power saving operation mode is selected, control device 14 compares the levels of a sinusoidal signal of a commercial frequency and a triangular wave signal of a frequency fL between the commercial frequency and frequency fH, and based on a result of the comparison, generates a gate signal for controlling converter 6. In the power saving operation mode, a gate signal is a pulse signal sequence having a frequency of a value corresponding to frequency fL of the triangular wave signal. The pulse width of the gate signal is controlled such that output DC voltage VDC of converter 6 attains to reference voltage VR2.

Figure 2:
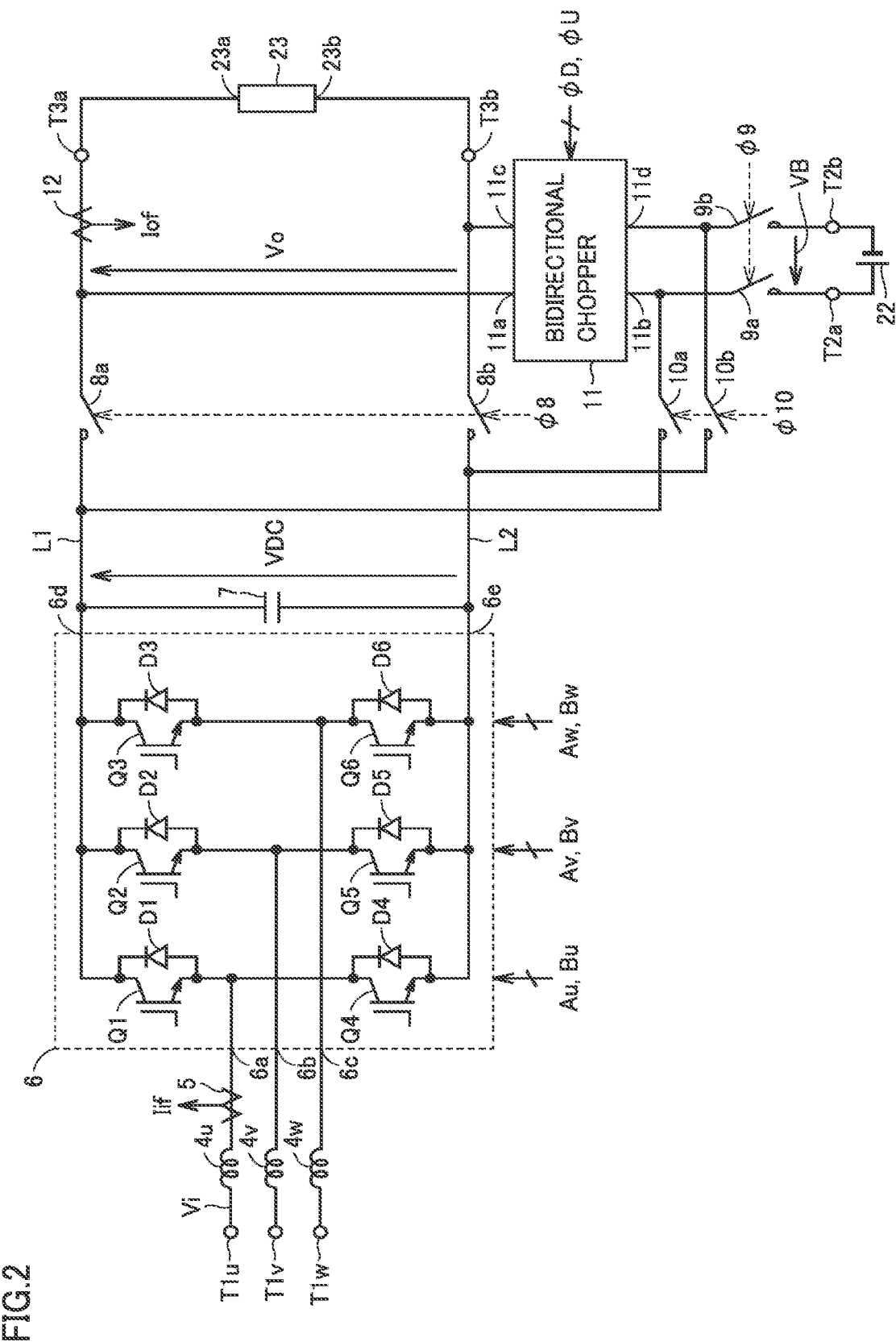
FIG. 2 is a circuit block diagram showing a main part of the uninterruptible power supply apparatus shown in FIG. 1.

FIG. 2 is a circuit block diagram showing a main part of uninterruptible power supply apparatus 1 shown in FIG. 1. Although FIG. 1 shows only a part of a three-phase AC voltage which corresponds to one phase, FIG. 2 shows a part corresponding to three phases. Although FIG. 1 shows only a part of DC voltage which corresponds to a positive voltage, FIG. 2 shows a part corresponding to a positive voltage and a negative voltage. Also, FIG. 2 does not show electromagnetic contactor 2, fuse 3, operation unit 13, and control device 14 of FIG. 1.

With reference to FIG. 2, uninterruptible power supply apparatus 1 includes AC input terminals T1u, T1v, and T1w, battery terminals T2a and T2b, DC output terminals T3a and T3b, reactors 4u, 4v, and 4w, current detector 5, converter 6, capacitor 7, DC lines L1 and L2, electromagnetic contactors 8a, 8b, 9a, 9b, 10a, and 10b, bidirectional chopper 11, and current detector 12.

AC input terminals T1u, T1v, and T1w receive a U-phase AC voltage, a V-phase AC voltage, and a W-phase AC voltage, respectively, from commercial AC power supply 21. Battery terminals T2a and T2b are connected to the positive electrode and the negative electrode of battery 22, respectively. DC output terminals T3a and T3b are connected to a positive-side power supply terminal 23a and a negative-side power supply terminal 23b of load 23, respectively.

Reactors 4u, 4v, and 4w have first terminals connected to AC input terminals T1u, T1v, and T1w, respectively, and second terminals connected to input nodes 6a, 6b, and 6c of converter 6, respectively. An instantaneous value of a U-phase AC voltage Vi is detected by control device 14 (FIG. 1). Current detector 5 detects current Ii flowing through reactor 4u and outputs a signal Iif indicating a detection value thereof to control device 14.

Converter 6 includes insulated gate bipolar transistors (IGBTs) Q1 to Q6 and diodes D1 to D6. The IGBT forms a switching element. IGBTs Q1 to Q3 have collectors connected to DC line L1 on the positive side through output node 6d and emitters connected to input nodes 6a, 6b, and 6c, respectively. IGBTs Q4 to Q6 have collectors connected to input nodes 6a, 6b, and 6c, respectively, and emitters connected to DC line L2 on the negative side through output node 6e. Diodes D1 to D6 are connected in anti-parallel with IGBTs Q1 to Q6, respectively. Capacitor 7 is connected between DC line L1 and DC line L2.

The gates of IGBTs Q1 and Q4 receive gate signals Au and Bu, respectively, the gates of IGBTs Q2 and Q5 receive gate signals Av and Bv, respectively, and the gates of IGBTs Q3 and Q6 receive gate signals Aw and Bw, respectively. A method of generating gate signals Au, Bu, Av, Bv, Aw, and Bw and the waveforms of these gate signals will be described below.

Gate signals Bu, Bv, and Bw are inverted signals of gate signals Au, Av, and Aw, respectively. Thus, when any one IGBT of IGBTs Q1 and Q4 is turned on, the other IGBT is turned off. When any one IGBT of IGBTs Q2 and Q5 is turned on, the other IGBT is turned off. When any one IGBT of IGBTs Q3 and Q6 is turned on, the other IGBT is turned off.

Gate signals Au and Bu, gate signals Av and Bv, and gate signals Aw and Bw are in synchronization with U-phase AC voltage, V-phase AC voltage, and W-phase AC voltage, respectively. Gate signals Au and Bu, gate signals Av and Bv, and gate signals Aw and Bw are out of phase with respect to each other by 120 degrees.

For example, when the U-phase AC voltage is higher than the V-phase AC voltage, gate signals Au and Bu attain to "H" level and "L" level, respectively, and gate signals Av and By attain to "L" level and "H" level, respectively, IGBTs Q1 and Q5 are turned on, and IGBTs Q2 and Q4 are turned off. Consequently, a current flows from AC input terminal T1u through reactor 4u, IGBT Q1, capacitor 7, IGBT Q5, and reactor 4v to AC input terminal T1v, so that capacitor 7 is charged.

Conversely, when the V-phase AC voltage is higher than the U-phase AC voltage, gate signals Au and Bu attain to "L" level and "H" level, respectively, and gate signals Av and By attain to "H" level and "L" level, respectively, IGBTs Q2 and Q4 are turned on, and IGBTs Q1 and Q5 are turned off Consequently, a current flows from AC input terminal T1v through reactor 4v, IGBT Q2, capacitor 7, IGBT Q4, and reactor 4u to AC input terminal T1u, so that capacitor 7 is charged. An instantaneous value of a voltage between terminals of capacitor 7 (i.e., a voltage between DC lines L1 and L2) VDC is detected by control device 14 (FIG. 1).

DC line L1 on the positive side is connected to the first terminal of electromagnetic contactor 8a, and the second terminal of electromagnetic contactor 8a is connected through DC output terminal T3a to positive-side power supply terminal 23a of load 23. DC line L2 on the negative side is connected to the first terminal of electromagnetic contactor 8b, and the second terminal of electromagnetic contactor 8b is connected through DC output terminal T3b to negative-side power supply terminal 23b of load 23.

Electromagnetic contactors 8a and 8b are turned on when a signal φ8 is at "H" level and is turned off when signal φ8 is at "L" level. An instantaneous value of DC voltage Vo between DC output terminals T3a and T3b is detected by control device 14. Current detector 12 detects current Io (i.e., load current IL) flowing through DC terminal T3a and outputs a signal Iof indicating a detection value thereof to control device 14.

The second terminals of electromagnetic contactors 8a and 8b are connected to high-voltage-side nodes 11a and 11c of bidirectional chopper 11, respectively. Electromagnetic contactor 9a has a first terminal connected to low-voltage-side node 11b of bidirectional chopper 11, and a second terminal connected through battery terminal T2a to a positive electrode of battery 22.

Electromagnetic contactor 9b has a first terminal connected to low-voltage-side node 11d of bidirectional chopper 11 and a second terminal connected through battery terminal T2b to a negative electrode of battery 22. Electromagnetic contactors 9a and 9b are turned on when a signal φ9 is at "H" level and is turned off when signal φ9 is at "L" level. An instantaneous value of DC voltage VB between battery terminals T2a and T2b is detected by control device 14.

Electromagnetic contactors 10a and 10b have first terminals connected to DC lines L1 and L2, respectively, and second terminals connected to low-voltage-side nodes 11b and 11d of bidirectional chopper 11, respectively. Electromagnetic contactors 10a and 10b are turned on when a signal φ10 is at "H" level and is turned off when signal φ10 is at "L" level. A method of generating signals φ8, φ9, and φ10 will be described below.

Figure 3:
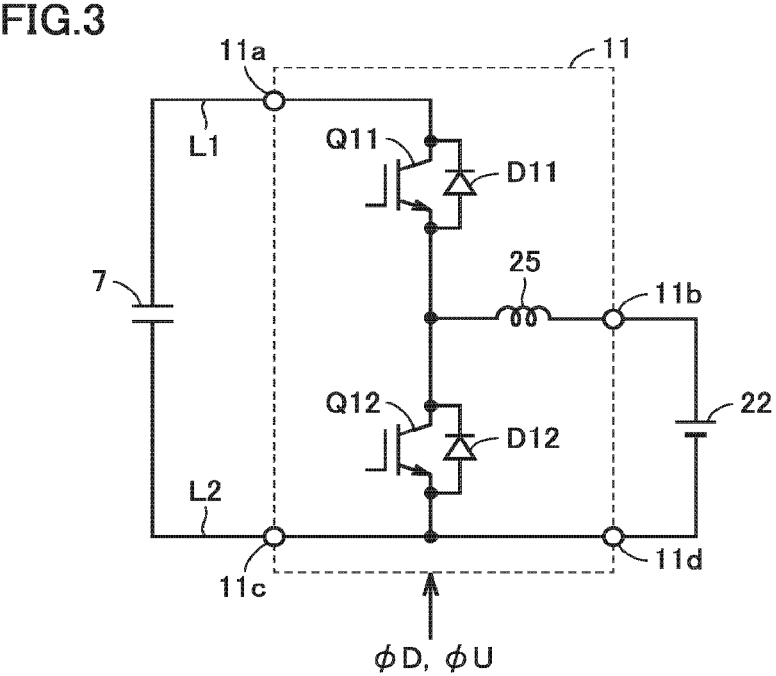
FIG. 3 is a circuit diagram showing a configuration of a bidirectional chopper shown in FIG. 2.

As shown in FIG. 3, bidirectional chopper 11 includes IGBTs Q11 and Q12, diodes D11 and D12, and a reactor 25. IGBT Q11 has a collector connected to high-voltage-side node 11a and an emitter connected through reactor 25 to low-voltage-side node 11b. IGBT Q12 has a collector connected to the emitter of IGBT Q11 and an emitter connected to nodes 11c and 11d.

Diodes D11 and D12 are connected in anti-parallel with IGBTs Q11 and Q12, respectively. The gates of IGBTs Q11 and Q12 receive gate signals φD and φU, respectively. FIG. 3 illustrates a case in which electromagnetic contactors 8a, 8b, 9a, and 9b are turned on, electromagnetic contactors 10a and 10b are turned off, high-voltage-side nodes 11a and 11c are connected to DC lines L1 and L2, respectively, and low-voltage-side nodes 11b and 11d are connected to the positive electrode and the negative electrode of battery 22, respectively.

During step-down operation, a gate signal φD is turned into a pulse signal sequence of a constant frequency, and a gate signal φU is fixed at "L" level. This turns on and off IGBT Q11 at a constant frequency and fixes IGBT Q12 at off state. When IGBT Q11 turns on, a current flows from the positive electrode of capacitor 7 through DC line L1, IGBT Q11, reactor 25, battery 22, and DC line L2 to the negative electrode of capacitor 7, so that battery 22 is charged and the electromagnetic energy is stored in reactor 25.

When IGBT 11 turns off, a current flows from the first terminal of reactor 25 through battery 22 and diode D12 to the second terminal of reactor 25, so that battery 22 is charged and electromagnetic energy of reactor 25 is released. A voltage between terminals VB of battery 22 falls below a voltage between terminals VDC of capacitor 7.

During step-up operation, gate signal φU is turned into a pulse signal sequence of a constant frequency, and gate signal φD is fixed at "L" level. This turns on and off IGBT Q12 at a constant frequency and fixes IGBT Q11 at off state. When IGBT Q12 turns on, a current flows from the positive electrode of battery 22 through reactor 25 and IGBT 12 to the negative electrode of battery 22, so that the electromagnetic energy is stored in reactor 25.

When IGBT 12 turns off, a current flows from the positive electrode of battery 22 through reactor 25, diode D11, DC line L1, capacitor 7, and DC line L2 to the negative electrode of battery 22, so that capacitor 7 is charged and the electromagnetic energy of reactor 25 is released. Voltage between terminals VDC of capacitor 7 falls below voltage between terminals VB of battery 22. A method of generating signals φD and φU will be described below.

Figure 4:
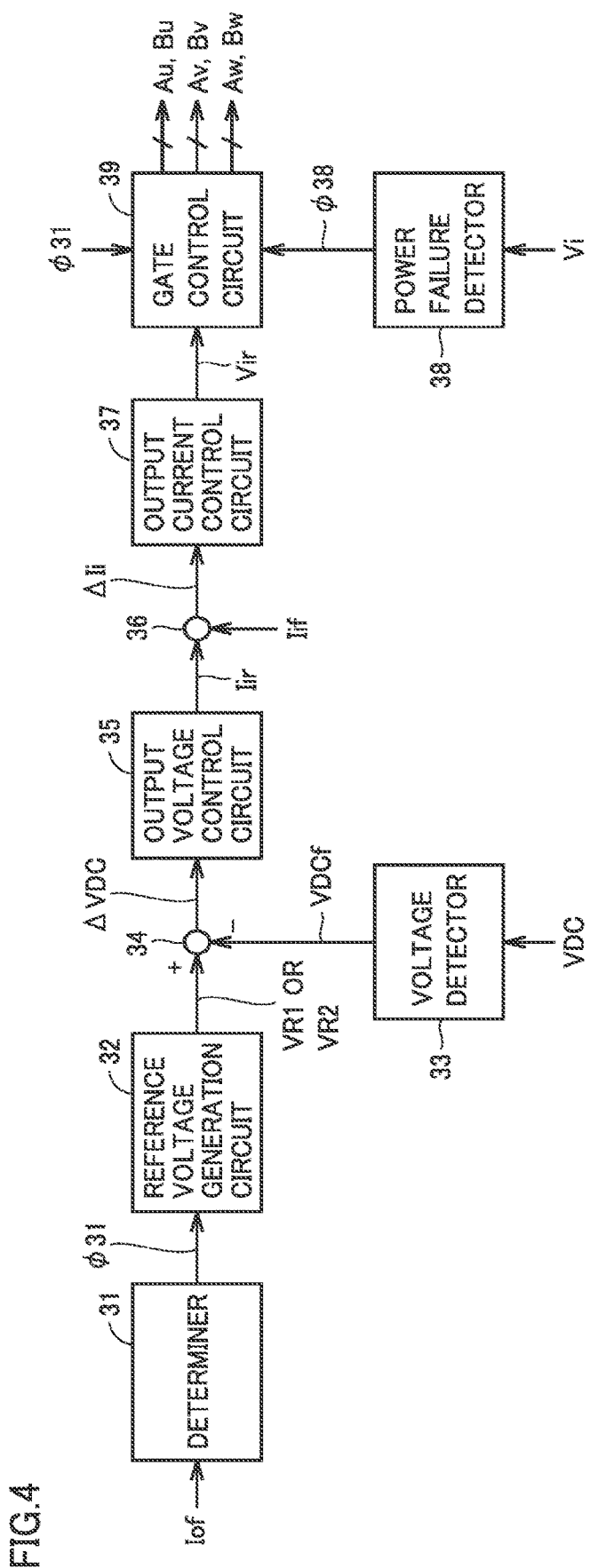
FIG. 4 is a block diagram showing a configuration of a part of a control device shown in FIG. 1, which relates to control of a converter.

FIG. 4 is a block diagram showing a configuration of a part of control device 14 shown in FIG. 1, which relates to control of converter 6. With reference to FIG. 4, control device 14 includes a determiner 31, a reference voltage generation circuit 32, a voltage detector 33, subtracters 34 and 36, an output voltage control circuit 35, an output current control circuit 37, a power failure detector 38, and a gate control circuit 39.

Determiner 31 determines whether output current Io is greater than predetermined value Ic based on output signal Iof of current detector 12 (FIGS. 1 and 2) and outputs a signal φ31 indicating a result of the determination. When output current Io is greater than predetermined value Ic, the normal operation mode is selected, and signal φ31 is set to "L" level. When output current Io is smaller than predetermined value Ic, the power saving operation mode is selected, and signal φ31 is set to "H" level.

Reference voltage generation circuit 32 outputs reference voltage VR1 (the rated voltage of load 23) when output signal φ31 of determiner 31 is at "L" level and outputs reference voltage VR2 (the rated voltage of battery 22) when output signal φ31 of determiner 31 is at "H" level. Voltage detector 33 detects output voltage (the DC voltage between DC lines L1 and L2) VDC of converter 6 and outputs a signal VDCf indicating a detection value. Subtracter 34 obtains a deviation ΔVDC between output voltage VR1 or VR2 of reference voltage generation circuit 32 and output signal VDCf of voltage detector 33.

Output voltage control circuit 35 adds a value proportional to deviation ΔVDC and an integration value of deviation ΔVDC to generate a current command value Iir. Subtracter 36 obtains a deviation ΔIi between a current command value Iir and a signal Iif from current detector 5 (FIGS. 1 and 2). Output current control circuit 37 adds a value proportional to deviation ΔIi and an integration value of deviation ΔIi to generate a voltage command value Vir. Voltage command value Vir is a sinusoidal signal of a commercial frequency.

Power failure detector 38 determines whether a power failure has occurred based on AC input voltage Vi (FIGS. 1 and 2) and outputs a signal φ38 indicating a result of the determination. Power failure detector 38 determines that no power failure has occurred when AC input voltage Vi is higher than a lower limit and determines that a power failure has occurred when AC input voltage Vi is lower than the lower limit. Signal φ38 is set to "H" level when no power failure has occurred, and signal φ38 is set to "L" level when a power failure has occurred.

Gate control circuit 39 generates gate signals Au, Bu, Av, Bv, Aw, and Bw (FIG. 2) for controlling converter 6 based on voltage command value Vir, output signal φ31 of determiner 31, and output signal φ38 of power failure detector 38.

Figure 5:
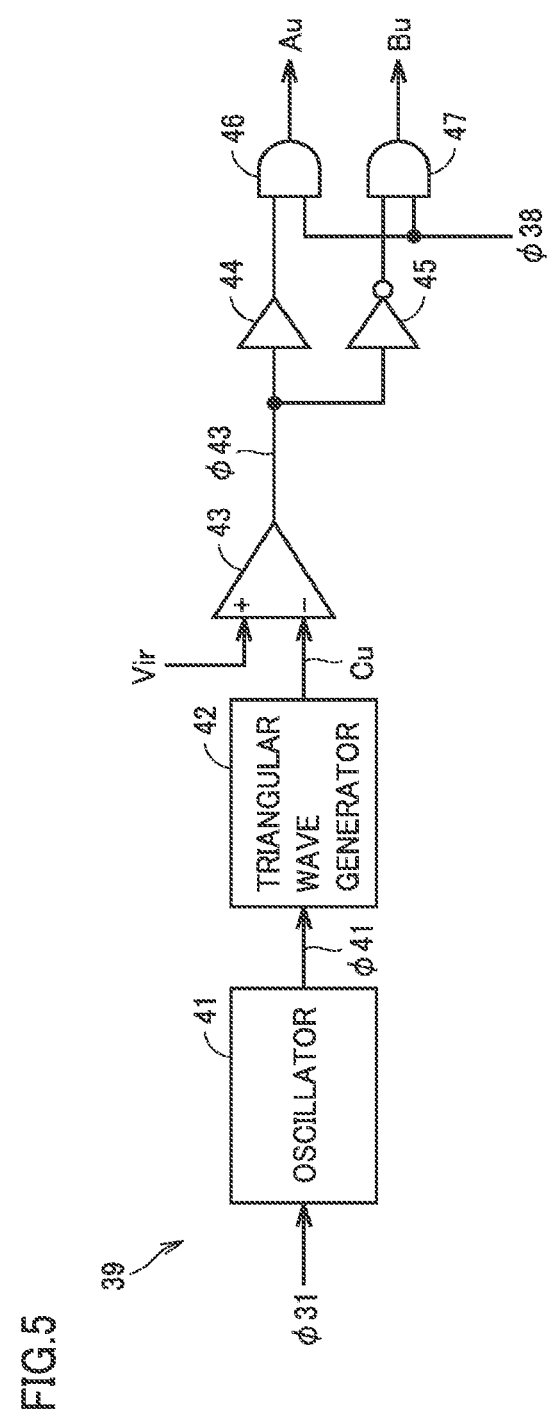
FIG. 5 is a circuit block diagram showing a main part of a gate control circuit shown in FIG. 4.

FIG. 5 is a circuit block diagram showing a main part of gate control circuit 39. With reference to FIG. 5, gate control circuit 39 includes an oscillator 41, a triangular wave generator 42, a comparator 43, a buffer 44, an inverter 45, and AND gates 46 and 47.

Oscillator 41 outputs a clock signal φ41 of a frequency fH (e.g., 20 KHz) sufficiently higher than a commercial frequency (e.g., 60 Hz) when output signal φ31 of determiner 31 (FIG. 4) is at "L" level, and outputs a clock signal φ41 of a frequency (e.g., 15 KHz) between the commercial frequency (e.g., 60 Hz) and frequency fH (e.g., 20 KHz) when signal φ31 is at "H" level. Triangular wave generator 42 outputs a triangular wave signal Cu of a frequency equal to that of output clock signal y41 of oscillator 41.

Comparator 43 compares the levels of voltage command value Vir (a sinusoidal signal of a commercial frequency) from output current control circuit 37 (FIG. 4) and triangular wave signal Cu from triangular wave generator 42 and outputs a pulse signal sequence φ43 indicating a result of the comparison. The frequency of pulse signal sequence φ43 has a value equal to that of frequency fH or fL of triangular wave signal Cu. A pulse width of pulse signal sequence φ43 changes in accordance with the level of voltage command value Vir. Pulse signal sequence φ43 is a pulse width modulation (PWM) signal.

Buffer 44 provides pulse signal sequence φ43 to the first input node of AND gate 46. Inverter 45 inverts pulse signal sequence φ43 and provides the inverted pulse signal sequence φ43 to the first input node of AND gate 47. The second input nodes of AND gates 46 and 47 receive an output signal φ38 of power failure detector 38 (FIG. 4). The output signals of AND gates 46 and 47 are gate signals Au and Bu, respectively.

When signal φ38 is at "H" level (when no power failure has occurred), the output signal of buffer 44 passes through AND gate 46 and turns into gate signal Au, and the output signal of inverter 45 passes through AND gate 47 and turns into gate signal Bu. When signal φ38 is at "L" level (when a power failure has occurred), both of gate signals Au and Bu that are output signals of buffer 44 and inverter 45, respectively, are fixed at "L" level.

Gate control circuit 39 generates gate signals Av and Bv and gate signals Aw and Bw by a method similar to the method of generating gate signals Au and Bu. Gate signals Au and Bu, gate signals Av and Bv, and gate signals Aw and Bw are out of phase with respect to each other by 120 degrees.

FIGS. 6(A), (B), and (C) are time charts showing waveforms of voltage command value Vir, triangular wave signal Cu, and gate signals Au and Bu shown in FIG. 5. It is assumed here that output signal φ38 of power failure detector 38 is set at "H" level.

As shown in FIG. 6(A), voltage command value Vir is a sinusoidal signal of a commercial frequency. Frequency fH or fL of triangular wave signal Cu is higher than the frequency (commercial frequency) of voltage command value Vir. A peak value of triangular wave signal Cu on the positive side is higher than a peak value of voltage command value Vir on the positive side. A peak value of triangular wave signal Cu on the negative side is lower than a peak value of voltage command value Vir on the negative side.

As shown in FIGS. 6(A) and (B), gate signal Au is at "L" level when the level of triangular wave signal Cu is higher than voltage command value Vir, and gate signal Au is at "H" level when the level of triangular wave signal Cu is lower than voltage command value Vir. Gate signal Au is a positive pulse signal sequence.

During a period in which voltage command value Vir has positive polarity, the pulse width of gate signal Au increases as voltage command value Vir increases. During a period in which voltage command value Vir has negative polarity, the pulse width of gate signal Au decreases as voltage command value Vir decreases. As shown in FIGS. 6(B) and (C), gate signal Bu is an inversion signal of gate signal Au. Each of gate signals Au and Bu is a PWM signal.

The waveforms of gate signals Au and Bu during the power saving operation mode are similar to the waveforms of gate signals Au and Bu during the normal operation mode. Here, frequencies fL of gate signals Au and Bu during the power saving operation mode are lower than frequencies fH of gate signals Au and Bu during the normal operation mode.

Although FIGS. 6(A), (B), and (C) show voltage command value Vir and waveforms of signals Cu, Au, and Bu which correspond to the U-phase, the same holds true for the voltage command value and the waveforms of the signals which correspond to each of the V-phase and the W-phase. The voltage command values and the signals which correspond to the U-phase, V-phase, and W-phase are out of phase with respect to each other by 120 degrees.

Figure 7:
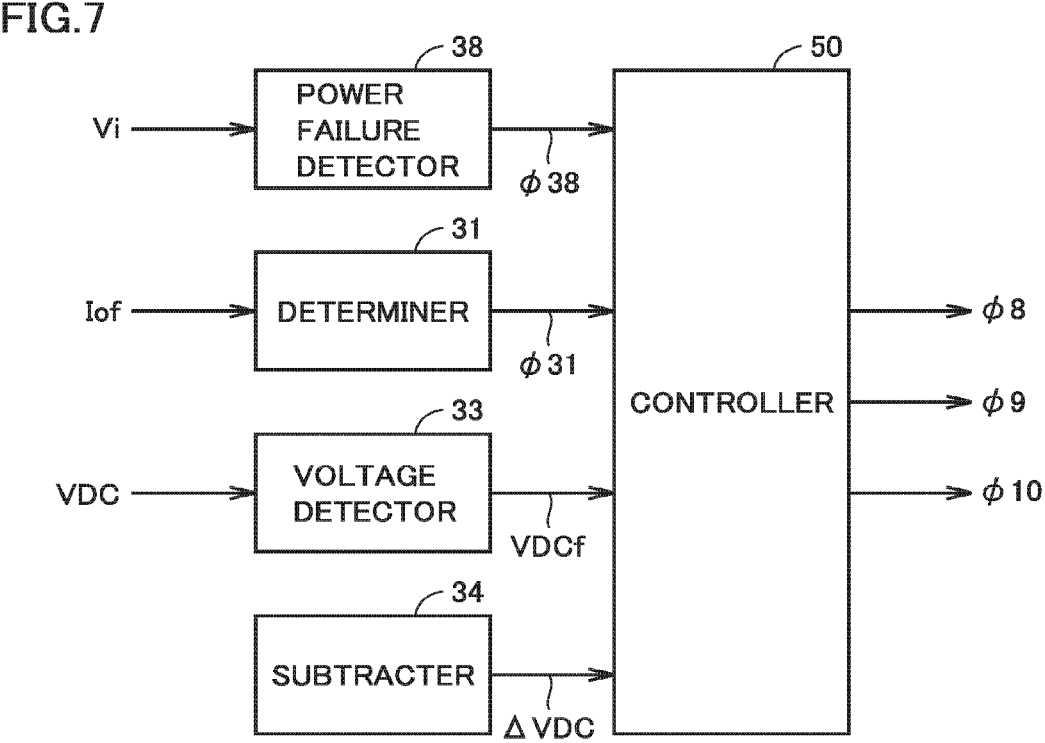
FIG. 7 is a block diagram showing a configuration of a part of the control device shown in FIG. 1, which relates to control of an electromagnetic contactor.

FIG. 7 is a block diagram showing a configuration of a part of control device 14 shown in FIG. 1, which relates to control of electromagnetic contactors 8a, 8b, 9a, 9b, 10a, and 10b. With reference to FIG. 7, control device 14 includes a controller 50. Controller 50 generates signals φ8, φ9, and φ10 (FIG. 2) based on output signal φ38 of power failure detector 38 (FIG. 4), output signal φ31 of determiner 31 (FIG. 4), output signal VDCf of voltage detector 33 (FIG. 4), and deviation ΔVDC from subtracter 34 (FIG. 4).

Controller 50 sets signals φ8 and φ9 to "H" level and signal φ10 to "L" level during "L" level of signal φ31 (during the normal operation mode) when signal φ38 is at "H" level (i.e., when AC power is supplied from commercial AC power supply 21). This turns on electromagnetic contactors 8a, 8b, 9a, and 9b and turns off electromagnetic contactors 10a and 10b, so that converter 6 is connected through electromagnetic contactors 8a and 8b to load 23 and converter 6 is connected through electromagnetic contactors 8a and 8b, bidirectional chopper 11, and electromagnetic contactors 9a and 9b to battery 22.

Controller 50 first sets signals φ8 and φ9 to "L" level and signal φ10 to "H" level during "H" level of signal φ31 (during the power saving operation mode) when signal φ38 is at "H" level (i.e., when AC power is supplied from commercial AC power supply 21). This turns off electromagnetic contactors 8a, 8b, 9a, and 9b and turns on electromagnetic contactors 10a and 10b, so that converter 6 is connected through electromagnetic contactors 10a and 10b and bidirectional chopper 11 to load 23.

Controller 50 sets signal φ9 to "H" level after DC voltage VDC attains to reference voltage VR2. This turns on electromagnetic contactors 9a and 9b, so that converter 6 is connected to battery 22 through electromagnetic contactors 10a, 10b, 9a, and 9b. Consequently, battery 22 is charged by converter 6.

Further, even during "H" level of signal φ31 (during the power saving operation mode), when deviation ΔVDC exceeds a predetermined value, controller 50 determines that load current IL has increased rapidly (or load 23 has changed from the standby state to the active state), and sets signals φ8 and φ9 to "H" level and signal φ10 to "L" level. This turns on electromagnetic contactors 8a, 8b, 9a, and 9b and turns off electromagnetic contactors 10a and 10b, so that converter 6 is connected through electromagnetic contactors 8a and 8b to load 23 and converter 6 is connected through electromagnetic contactors 8a and 8b, bidirectional chopper 11, and electromagnetic contactors 9a and 9b to battery 22.

Further, controller 50 sets signals φ8 and φ9 to "H" level and signal φ10 to "L" level during a power failure in which a supply of the AC power from commercial AC power supply 21 is stopped. This turns on electromagnetic contactors 8a, 8b, 9a, and 9b and turns off electromagnetic contactors 10a and 10b, so that battery 22 is connected through electromagnetic contactors 9a and 9b and bidirectional chopper 11 to load 23. At this time, the operation of converter 6 is stopped.

Figure 8:
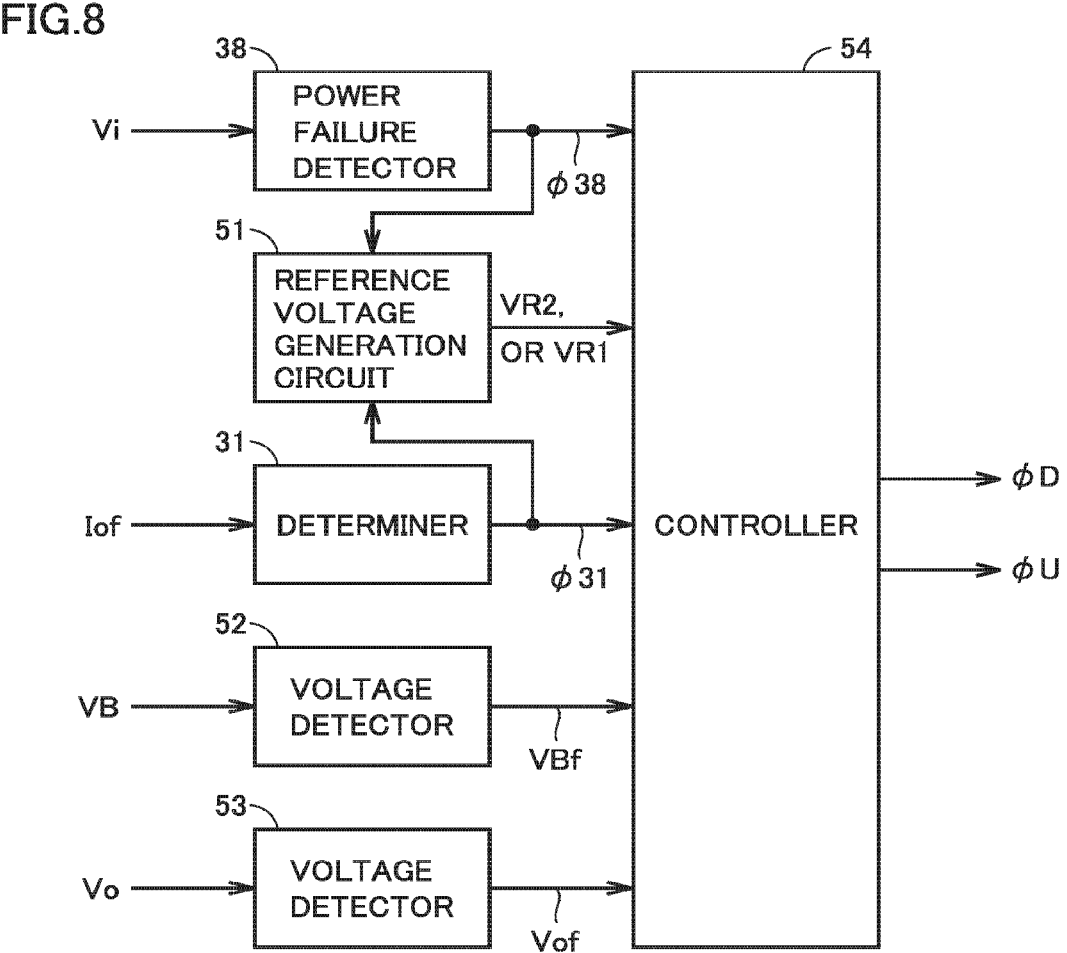
FIG. 8 is a block diagram showing a configuration of a part of the control device shown in FIG. 1, which relates to control of the bidirectional chopper.

FIG. 8 is a block diagram showing a configuration of a part of control device 14 shown in FIG. 1, which relates to control of bidirectional chopper 11. With reference to FIG. 8, control device 14 includes a reference voltage generation circuit 51, voltage detectors 52 and 53, and a controller 54.

Reference voltage generation circuit 51 outputs reference voltage VR1 (the rated voltage of load 23) or reference voltage VR2 (the rated voltage of battery 22) based on a combination of output signal φ38 of power failure detector 38 (FIG. 4) and output signal φ31 of determiner 31. When signals φ38 and φ31 are at "H" level and "L" level, respectively, that is, when no power failure has occurred and the operation mode is the normal operation mode, reference voltage generation circuit 51 outputs reference voltage VR2.

When both of signals φ38 and φ31 are at "H" level, that is, when no power failure has occurred and the mode is the power saving operation mode, reference voltage generation circuit 51 outputs reference voltage VR1. Reference voltage generation circuit 51 outputs reference voltage VR1 irrespective of signal φ31 when signal φ38 attains to "L" level, that is, irrespective of whether the operation mode is the normal operation mode or the power saving operation mode when a power failure has occurred.

Voltage detector 52 detects voltage between terminals VB (the DC voltage between battery terminals T2a and T2b) of battery 22 and outputs a signal VBf indicating a detection value. Voltage detector 53 detects output voltage Vo (a DC voltage between DC output terminals T3a and T3b) of uninterruptible power supply apparatus 1 and outputs a signal Vof indicating a detection value.

Controller 54 generates signals φD and φU (FIGS. 2 and 3) based on output signal φ38 of power failure detector 38 (FIG. 4), output voltage VR2 or VR1 of reference voltage generation circuit 51, output signal φ31 of determiner 31 (FIG. 4), output signal VBf of voltage detector 52, and output signal Vof of voltage detector 53.

During "L" level of signal φ31 (during the normal operation mode) when signal φ38 is at "H" level (i.e., when AC power is supplied from commercial AC power supply 21), controller 54 outputs a pulse signal sequence of a constant frequency as signal φD and fixes signal φU at "L" level.

This turns on IGBT Q11 of bidirectional chopper 11 (FIG. 3) at a constant frequency and fixes IGBT Q12 at off state, so that DC power is supplied from capacitor 7 to battery 22. At this time, controller 54 controls the pulse width of signal φD based on output signal VBf of voltage detector 52 such that battery voltage VB attains to reference voltage VR2.

During "H" level of signal φ31 (during the power saving operation mode) when signal φ38 is at "H" level (i.e., when AC power is supplied from commercial AC power supply 21), controller 54 outputs a pulse signal sequence of a constant frequency as signal φU and fixes signal φD at "L" level.

This turns on and off IGBT Q12 of bidirectional chopper 11 at a constant frequency and fixes IGBT Q11 at off state, so that DC power is supplied from converter 6 through bidirectional chopper 11 to load 23. At this time, controller 54 controls the pulse width of signal φU based on output signal Vof of voltage detector 53 such that output voltage Vo attains to reference voltage VR1.

Further, during a power failure in which a supply of the AC power from commercial AC power supply 21 is stopped, controller 54 outputs a pulse signal sequence of a constant frequency as signal φU and fixes signal φD at "L" level. This turns on and off IGBT Q12 of bidirectional chopper 11 at the constant frequency and fixes IGBT Q11 at off state, so that DC power is supplied from battery 22 through bidirectional chopper 11 to load 23. At this time, controller 54 controls the pulse width of signal φU based on output signal Vof of voltage detector 53 such that output voltage Vo attains to reference voltage VR1.

FIGS. 6(A), (B), and (C) reveal that as the frequency of triangular wave signal Cu is increased, the frequencies of gate signals Au, Bu, Av, Bv, Aw, and Bw become higher and switching frequencies (the number of ons and offs per second) of IGBTs Q1 to Q6 become higher. As the switching frequencies of IGBTs Q1 to Q6 become higher, switching losses occurring in IGBTs Q1 to Q6 and reverse recovery losses occurring in diodes D1 to D6 increase, thus reducing the efficiency of uninterruptible power supply apparatus 1. In order to supply a large load current IL while keeping DC voltage Vo at reference voltage VR1, however, the switching frequencies of IGBTs Q1 to Q6 need to be set to be sufficiently high.

Conversely, as the frequency of triangular wave signal Cu is reduced, the frequencies of gate signals Au, Bu, Av, Bv, Aw, and Bw become lower, and the switching frequencies of IGBTs Q1 to Q6 become lower. As the switching frequencies of IGBTs Q1 to Q6 become lower, switching losses occurring in IGBTs Q1 to Q6 and reverse recovery losses occurring in diodes D1 to D6 decrease, thereby increasing the efficiency of uninterruptible power supply apparatus 1. However, reducing the switching frequencies of IGBTs Q1 to Q6 makes it difficult to keep DC voltage Vo at reference voltage VR1 if load current IL is large.

In a conventional uninterruptible power supply apparatus, the frequency of triangular wave signal Cu is fixed at a frequency fH (e.g., 20 KHz) much higher than the commercial frequency (e.g., 60 Hz). This allows DC voltage Vo to be kept at reference voltage VR1 even at a large load current IL. On the other hand, relatively large losses occur in IGBTs Q1 to Q6 and diodes D1 to D6, reducing the efficiency of the uninterruptible power supply apparatus.

At a small load current IL, however, output voltage Vo can be kept at reference voltage VR1 even when the switching frequencies of IGBTs Q1 to Q6 are reduced. Also, reducing the switching frequencies of IGBTs Q1 to Q6 can reduce the losses occurring in IGBTs Q1 to Q6 and diodes D1 to D6, increasing the efficiency of the uninterruptible power supply apparatus. Reducing the output voltage (i.e., DC voltage between DC lines L1 and L2) VDC of converter 6 can reduce losses occurring in IGBTs Q1 to Q6 and diodes D1 to D6.

Considering the above, in Embodiment 1, the normal operation mode and the power saving operation mode are provided. In the normal operation mode, converter 6 is controlled at a relatively high frequency fH, and output voltage VDC of converter 6 is supplied directly to load 23. In the power saving operation mode, converter 6 is controlled at a relatively low frequency fL, and output voltage VDC of converter 6 is stepped up by bidirectional chopper 11 and supplied to load 23, reducing a loss occurring in converter 6.

Compared with converter 6, bidirectional chopper 11 has few switching elements that are caused to perform a switching operation in driving and can set a switching frequency to low frequency. This results in a loss occurring in bidirectional chopper 11 much smaller than a loss occurring in converter 6. In the power saving operation mode, thus, an amount of decrease in the loss occurring in converter 6 exceeds the loss occurring in bidirectional chopper 11, resulting in a reduced loss of uninterruptible power supply apparatus 1 as a whole.

When output current Io (load current IL) is greater than predetermined value Ic, the normal operation mode is selected. When output current Io is smaller than predetermined value Ic, the power saving operation mode is selected. When output current Io is smaller than predetermined value Ic, frequency fL is set to a frequency within the range in which DC voltage Vo can be kept at reference voltage VR1 (the rated voltage of load 23).

As frequency IL is reduced, a harmonic current, which flows from converter 6 through low pass filter (reactor 4) to commercial AC power supply 21, increases. Frequency fL is set within the range in which the harmonic current does not exceed an upper limit.

A method of using uninterruptible power supply apparatus 1 and an operation of uninterruptible power supply apparatus 1 will now be described. It is assumed here that load current IL is greater than predetermined value Ic when load 23 is in the active state and that load current IL is smaller than predetermined value Ic when load 23 is in the standby state.

A case in which load 23 normally operates will be described first. In this case, output current Io (i.e., load current IL) of uninterruptible power supply apparatus 1 is greater than predetermined value Ic, and accordingly, output signal φ31 of determiner 31 (FIGS. 4, 7, and 8) enters "L" level, so that the normal operation mode is selected.

When output signal φ31 of determiner 31 is set to "L" level, controller 50 (FIG. 7) sets signals φ8 and φ9 to "H" level and signal φ10 to "L" level. This turns on electromagnetic contactors 8a, 8b, 9a, and 9b and turns off electromagnetic contactors 10a and 10b.

Reference voltage generation circuit 32 (FIG. 4) generates reference voltage VR1 (the rated voltage of load 23), and voltage detector 33 generates signal VDCf indicating a detection value of DC voltage VDC. Subtracter 34 generates deviation ΔVDC between reference voltage VR1 and signal VDCf, and based on deviation ΔVDC, output voltage control circuit 35 generates current command value Iir.

Subtracter 36 generates deviation ΔIi between current command value Iir and signal Iif from current detector 5 (FIGS. 1 and 2), and based on deviation ΔIi, output current control circuit 37 generates voltage command value Vir.

Since output signal φ31 of determiner 31 is at "L" level in gate control circuit 39, oscillator 41 and triangular wave generator 42 generate triangular wave signal Cu of relatively high frequency fH. Comparator 43 compares voltage command value Vir with triangular wave signal Cu and generates pulse signal sequence φ43, and buffer 44, inverter 45, and AND gates 46 and 47 generate gate signals Au and Bu. Gate signals Av and Bv, which are out of phase with respect to gate signals Au and Bu by 120 degrees, and gate signals Aw and Bw, which are out of phase with respect to gate signals Au and Bu by 240 degrees, are generated.

In converter 6 (FIG. 2), IGBTs Q1 to Q6 are driven by gate signals Au, Bu, Av, Bv, Aw, and Bw, and a three-phase AC voltage from commercial AC power supply 21 is converted to a DC voltage VDC(=VR1). The DC power generated by converter 6 is supplied through electromagnetic contactors 8a and 8b to load 23 and is also supplied through bidirectional chopper 11 to battery 22.

When output signal φ31 of determiner 31 is set to "L" level, reference voltage generation circuit 51 (FIG. 8) outputs reference voltage VR2 (the rated voltage of battery 22), and controller 54 (FIG. 8) outputs a pulse signal sequence of a constant frequency as signal φD and fixes signal φU at "L" level.

This periodically turns on and off IGBT Q11 of bidirectional chopper 11 (FIG. 3) and fixes IGBT Q12 at off state, so that the DC power generated by converter 6 is stored in battery 22 through electromagnetic contactors 9a and 9b. Controller 54 controls the pulse width of signal φD such that voltage between terminals VB of battery 22 attains to reference voltage VR2.

In this normal operation mode, each of IGBTs Q1 to Q6 is turned on and off at a relatively high frequency fH, allowing for a supply of large load current IL while keeping output voltage Vo at reference voltage VR1 (the rated voltage of load 23). Note that the switching losses occurring in IGBTs Q1 to Q6 and the reverse recovery losses occurring in diodes D1 to D6 increase, reducing the efficiency of uninterruptible power supply apparatus 1.

The case in which load 23 is changed from the active state to the standby state will now be described. In this case, output current Io (i.e., load current IL) of uninterruptible power supply apparatus 1 is smaller than predetermined value Ic, and accordingly, output signal φ31 of determiner 31 (FIGS. 4, 7, and 8) is set to "H" level, and the power saving operation mode is selected.

When output signal φ31 of determiner 31 is set to "H" level, controller 50 (FIG. 7) sets signals φ8 and φ9 to "L" level and signal p10 to "H" level. This turns off electromagnetic contactors 8a, 8b, 9a, and 9b and turns on electromagnetic contactors 10a and 10b.

Reference voltage generation circuit 32 (FIG. 4) generates reference voltage VR2 (the rated voltage of battery 22), and voltage detector 33 generates signal VDCf indicating a detection value of DC voltage VDC. Subtracter 34 generates deviation ΔVDC between reference voltage VR2 and signal VDCf, and based on deviation ΔVDC, output voltage control circuit 35 generates current command value Iir.

Subtracter 36 generates deviation ΔIi between current command value Iir and signal Iif from current detector 5 (FIGS. 1 and 2), and based on deviation ΔIi, output current control circuit 37 generates voltage command value Vir.

Since output signal p31 of determiner 31 is at "H" level in gate control circuit 39, oscillator 41 and triangular wave generator 42 generate triangular wave signal Cu of relatively low frequency fL. Comparator 43 compares voltage command value Vir with triangular wave signal Cu and generates pulse signal sequence φ43, and buffer 44, inverter 45, and AND gates 46 and 47 generate gate signals Au and Bu. Gate signals Av and Bv, which are out of phase with respect to gate signals Au and Bu by 120 degrees, and gate signals Aw and Bw, which are out of phase with respect to gate signals Au and Bu by 240 degrees, are generated.

In converter 6 (FIG. 2), IGBTs Q1 to Q6 are driven by gate signals Au, Bu, Av, Bv, Aw, and Bw, and a three-phase AC voltage from commercial AC power supply 21 is converted to a DC voltage VDC. The DC power generated by converter 6 is supplied through electromagnetic contactors 10a and 10b to bidirectional chopper 11.

When output voltage VDC of converter 6 attains to reference voltage VR2, controller 50 (FIG. 7) sets signal φ9 to "H" level and turns on electromagnetic contactors 9a and 9b. Consequently, the DC power generated by converter 6 is stored in battery 22 through electromagnetic contactors 10a, 10b, 9a, and 9b.

When output signal p31 of determiner 31 is set to "H" level, reference voltage generation circuit 51 (FIG. 8) outputs reference voltage VR1 (the rated voltage of load 23), and controller 54 (FIG. 8) outputs a pulse signal sequence of a constant frequency as signal φU and fixes signal φD at "L" level.

This periodically turns on and off IGBT Q12 of bidirectional chopper 11 (FIG. 3) and fixes IGBT Q11 at off state, so that the DC power generated by converter 6 is supplied to load 23 through electromagnetic contactors 10a and 10b and bidirectional chopper 11. Controller 54 controls the pulse width of signal φU such that DC voltage Vo between DC output terminals T3a and T3b attains to reference voltage VR1.

In this power saving operation mode, each of IGBTs Q1 to Q6 is turned on and off at a relatively low frequency fL, and output voltage VDC of converter 6 decreases. This reduces the switching losses occurring in IGBTs Q1 to Q6 and the reverse recovery losses occurring in diodes D1 to D6, thus increasing the efficiency of uninterruptible power supply apparatus 1. Since load current IL is small, output voltage Vo can be kept at reference voltage VR1 (the rated voltage of load 23).

When load current IL increases rapidly due to a change of load 23 from the standby state to the normal operation state, deviation ΔVDC output from subtracter 34 (FIGS. 4 and 7) exceeds a predetermined value. Consequently, controller 50 (FIG. 7) sets signals φ8 and φ9 to "H" level and signal φ10 to "L" level. This turns on electromagnetic contactors 8a, 8b, 9a, and 9b and turns off electromagnetic contactors 10a and 10b, so that the power saving operation mode is rapidly switched to the normal operation mode.

When a supply of the AC power from commercial AC power supply 21 is stopped, that is, when a power failure has occurred, output signal φ38 of power failure detector 38 (FIGS. 4, 7, and 8) is set to "L" level. When output signal φ38 of power failure detector 38 is set to "L" level, gate control circuit 39 (FIGS. 4 and 5) sets gate signals Au, Bu, Av, Bv, Aw, and Bw to "L" level and sets IGBTs Q1 to Q6 to the off state, so that the operation of converter 6 is stopped.

When output signal φ38 of power failure detector 38 is set to "L" level, controller 50 (FIG. 7) sets signals φ8 and φ9 to "H" level and signal φ10 to "L" level. This turns on electromagnetic contactors 8a, 8b, 9a, and 9b and turns off electromagnetic contactors 10a and 10b.

When output signal φ38 of power failure detector 38 is set to "L" level, reference voltage generation circuit 51 (FIG. 8) outputs reference voltage VR1 (the rated voltage of load 23), and controller 54 (FIG. 8) outputs a pulse signal sequence of a constant frequency as signal φU and fixes signal φD at "L" level.

This periodically turns on and off IGBT Q12 of bidirectional chopper 11 (FIG. 3) and fixes IGBT Q11 at off state, so that the DC power stored in battery 22 is supplied to load 23 through electromagnetic contactors 9a and 9b and bidirectional chopper 11. Controller 54 controls the pulse width of signal φU such that DC voltage Vo between DC output terminals T3a and T3b attains to reference voltage VR1. Thus, the operation of load 23 can be continued during a period in which DC power is stored in battery 22.

As described above, in Embodiment 1, when load current IL is greater than predetermined value Ic, converter 6 is driven at a relatively high frequency fH, and output voltage VDC of converter 6 is supplied directly to load 23, thus stably driving load 23. When load current IL is smaller than predetermined value Ic, converter 6 is driven at a relatively low frequency fL, and output voltage VDC of converter 6 is stepped up by bidirectional chopper 11 and supplied to load 23. This reduces a loss occurring in converter 6, increasing the efficiency of uninterruptible power supply apparatus 1.

Embodiment 2

In Embodiment 1, in switching from the power saving operation mode to the normal operation mode, controller 50 (FIG. 7) sets signals φ8 and φ9 to "H" level and signal φ10 to "L" level. This turns on electromagnetic contactors 8a and 8b (FIG. 2) and turns off electromagnetic contactors 10a and 10b, so that the DC power generated by converter 6 is supplied directly to load 23 through electromagnetic contactors 8a and 8b.

However, it takes time for electromagnetic contactors 8a and 8b to actually turn on from setting of signal φ8 to "H" level due to slow response speeds of electromagnetic contactors 8a and 8b, leading to a fear that a power supply to load 23 may be delayed correspondingly. Embodiment 2 solves this problem.

Figure 9:
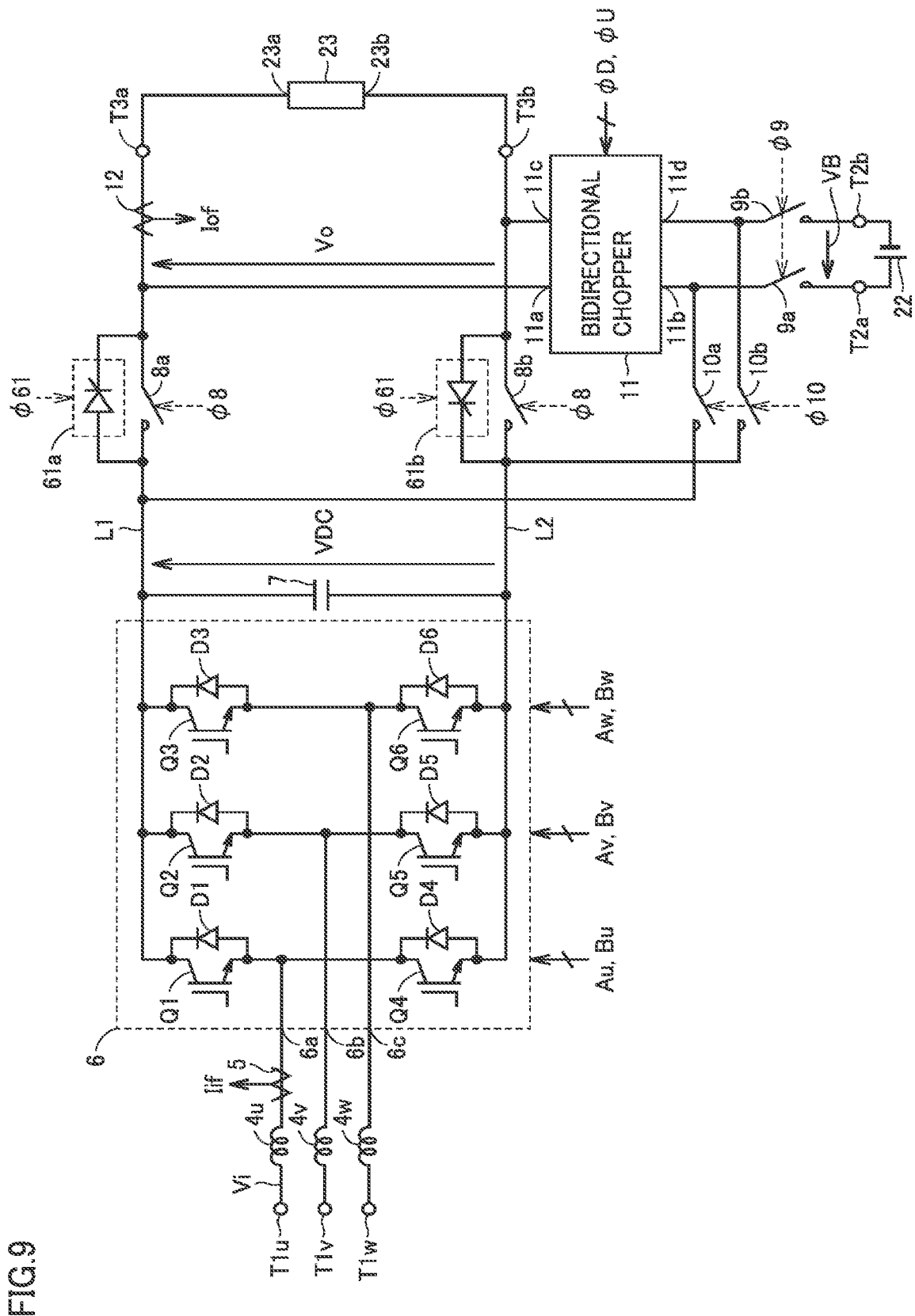
FIG. 9 is a circuit block diagram showing a main part of an uninterruptible power supply apparatus according to Embodiment 2 of the present invention.

FIG. 9 is a circuit block diagram showing a main part of an uninterruptible power supply apparatus according to Embodiment 2 of the present invention, which is compared with FIG. 2. The uninterruptible power supply apparatus in FIG. 9 differs from uninterruptible power supply apparatus 1 in FIG. 1 in that semiconductor switches 61a and 61b are added.

Semiconductor switches 61a and 61b are connected in parallel with electromagnetic contactors 8a and 8b, respectively. Semiconductor switch 61a includes, for example, a thyristor having an anode connected to DC line L1 and a cathode connected to DC output terminal T3a. Semiconductor switch 61b includes, for example, a thyristor having an anode connected to DC output terminal T3b and a cathode connected to DC line L2.

Both of semiconductor switches 61a and 61b are controlled by a signal φ61. Semiconductor switches 61a and 61b are turned off when signal φ61 is at "L" level and are instantaneously turned on when signal φ61 is set to "H" level.

Figure 10:
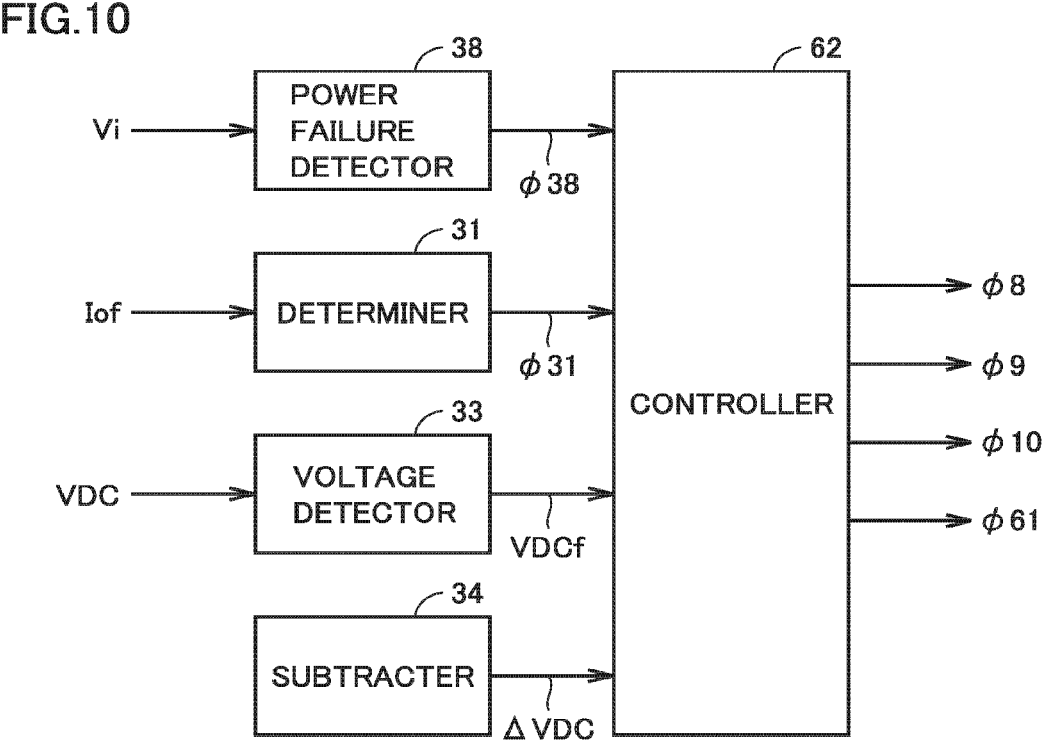
FIG. 10 is a block diagram showing a configuration of a part of a control device included in the uninterruptible power supply apparatus shown in FIG. 9, which relates to control of a semiconductor switch and an electromagnetic contactor.

FIG. 10 is a block diagram showing a configuration of a part of the control device included in this uninterruptible power supply apparatus, which relates to control of semiconductor switches 61a and 61b and electromagnetic contactors 8a, 8b, 9a, 9b, 10a, and 10b. FIG. 10 is compared with FIG. 7. With reference to FIG. 10, the uninterruptible power supply apparatus is provided with a controller 62 in place of controller 50 (FIG. 7).

Controller 62 operates similarly to controller 50, and besides, outputs signal φ61. Signal φ61 is raised from "L" level to "H" level simultaneously with signal φ8 and is lowered from "H" level to "L" level after a lapse of a predetermined period of time.

For example, during the power saving operation mode, electromagnetic contactors 8a and 8b are turned off, and electromagnetic contactors 9a, 9b, 10a, and 10b are turned on, so that output voltage VDC of converter 6 is supplied to load 23 through electromagnetic contactors 10a and 10b and bidirectional chopper 11. When load 23 is changed from the standby state to the normal operation mode and load current IL increases rapidly in this case, deviation ΔVDC output from subtracter 34 (FIGS. 4 and 10) increases.

When deviation ΔVC exceeds the predetermined value, controller 62 raises signals φ8 and φ61 from "L" level to "H" level and lowers signal φ10 from "H" level to "L" level, and after a lapse of a predetermined period of time, lowers signal φ61 from "H" level to "L" level.

Since the response speeds of semiconductor switches 61a and 61b are faster than the response speeds of electromagnetic contactors 8a and 8b, when signals φ8 and φ61 are raised from "L" level to "H" level, semiconductor switches 61a and 61b are turned on instantaneously, but electromagnetic contactors 8a and 8b are turned on after a lapse of a delay time. Semiconductor switches 61a and 61b are turned on for a period of time longer than the delay time of electromagnetic contactors 8a and 8b.

Semiconductor switches 61a and 61b are thus turned off after electromagnetic contactors 8a and 8b are turned on. The reason why semiconductor switches 61a and 61b are turned on for a predetermined period of time is that continuously flowing a current through semiconductor switches 61a and 61b excessively increases the temperatures of semiconductor switches 61a and 61b, which may lead to breakage of semiconductor switches 61a and 61b.

When signal φ10 is lowered from "H" level to "L" level, electromagnetic contactors 10a and 10b are turned off. Since electromagnetic contactors 10a and 10b have a small size and a fast response speed compared with electromagnetic contactors 8*a* and 8*b*, electromagnetic contactors 10*a* and 10*b* are turned off earlier than electromagnetic contactors 8*a* and 8*b* are turned on.

When load current IL increases rapidly due to a change of load 23 from the standby state to the normal operation state, output signal φ31 of determiner 31 (FIGS. 4, 7, and 8) is lowered from "H" level to "L" level. When signal φ31 is set to "L" level, reference voltage generation circuit 32 (FIG. 4) outputs reference voltage VR1, so that output voltage VDC of converter 6 attains to reference voltage VR1.

Output voltage VDC of converter 6 is first provided to load 23 through semiconductor switches 61*a* and 61*b*, then provided to load 23 through semiconductor switches 61*a* and 61*b* and electromagnetic contactors 8*a* and 8*b*, and then, supplied to load 23 through electromagnetic contactors 8*a* and 8*b*. When signal φ31 is set to "L" level, reference voltage generation circuit 51 (FIG. 8) outputs reference voltage VR2, and bidirectional chopper 11 charges battery 22 to reference voltage VR2.

In Embodiment 2, semiconductor switches 61*a* and 61*b* are connected in parallel with electromagnetic contactors 8*a* and 8*b*, respectively, enabling a rapid switch from the power saving operation mode to the normal operation mode.

It should be construed that the embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1 uninterruptible power supply apparatus, T1, T1*u*, T1*v*, T1*w* AC input terminal, T2, T2*a*, T2*b* battery terminal, T3, T3*a*, T3*b* DC output terminal, 2, 8, 8*a*, 8*b*, 9, 9*a*, 9*b*, 10, 10*a*, 10*b* electromagnetic contactor, 3 fuse, 4, 4*u*, 4*v*, 4*w*, 25 reactor, 5, 12 current detector, 6 converter, 7 capacitor, L1, L2 DC line, 11 bidirectional chopper, 13 operation unit, 14 control device, 21 commercial AC power supply, 22 battery, 23 load, Q1-Q6, Q11, Q12 IGBT, D1-D6, D11, D12 diode, 31 determiner, 32, 51 reference voltage generation circuit, 33, 52, 53 voltage detector, 34, 36 subtracter, 35 output voltage control circuit, 37 output current control circuit, 38 power failure detector, 39 gate control circuit, 41 oscillator, 42 triangular wave generator, 43 comparator, 44 buffer, 45 inverter, 46, 47 AND gate, 50, 54, 62 controller, 61*a*, 61*b* semiconductor switch.

The invention claimed is:

1. A power supply apparatus that performs an operation mode selected from a first operation mode and a second operation mode, the power supply apparatus comprising:
   an output terminal for supplying DC power to a load;
   a converter configured to convert AC power to DC power and output the DC power to a first node;
   a bidirectional chopper configured to
      during the first operation mode, step down a DC voltage of the output terminal and output the DC voltage to a second node, and
      during the second operation mode, step up the DC voltage of the second node and output the DC voltage to the output terminal;
   a switch circuit configured to
      during the first operation mode, connect the first node to the output terminal and connect the second node to a power storage apparatus, and
      during the second operation mode, connect the first node to the second node;
   a first controller configured to
      during the first operation mode, control the converter such that a DC voltage of the first node attains to a first reference voltage, and
      during the second operation mode, control the converter such that the DC voltage of the first node attains to a second reference voltage lower than the first reference voltage; and
   a second controller configured to
      during the first operation mode, control the bidirectional chopper such that the DC voltage of the second node attains to the second reference voltage, and
      during the second operation mode, control the bidirectional chopper such that the DC voltage of the output terminal attains to the first reference voltage.

2. The power supply apparatus according to claim 1, wherein the switch circuit is configured to connect the first node to the second node and the power storage apparatus during the second operation mode.

3. The power supply apparatus according to claim 1, further comprising:
   a current detector configured to detect a load current; and
   a selector configured to
      select the first operation mode when a detection value of the current detector is greater than a predetermined current value, and
      select the second operation mode when the detection value of the current detector is smaller than the predetermined current value.

4. The power supply apparatus according to claim 1, wherein
   the converter includes
      a plurality of switching elements, and
      a plurality of diodes each of which is connected in anti-parallel with a corresponding one of the plurality of switching elements, and
   the first controller is configured to
      during the first operation mode, control the plurality of switching elements at a first frequency such that the DC voltage of the first node attains to the first reference voltage, and
      during the second operation mode, control the plurality of switching elements at a second frequency lower than the first frequency such that the DC voltage of the first node attains to the second reference voltage.

5. The power supply apparatus according to claim 4, wherein
   the converter is configured to convert AC power of a commercial frequency which is supplied from a commercial AC power supply to DC power and output the DC power to the first node, and
   the first controller includes
      a voltage generator configured to
         generate the first reference voltage during the first operation mode, and
         generate the second reference voltage during the second operation mode,
      a voltage command unit configured to generate a sinusoidal signal of the commercial frequency so as to eliminate a deviation between the DC voltage of the first node and the first reference voltage or the second reference voltage generated by the voltage generator,
      a triangular wave generator configured to
         generate a triangular wave signal of the first frequency during the first operation mode, and generate a triangular wave signal of the second frequency during the second operation mode, and a comparator configured to compare levels of the sinusoidal signal and the triangular wave signal and generate a control signal for controlling the plurality of switching elements based on a result of the comparison.

6. The power supply apparatus according to claim 1, wherein the switch circuit includes an electromagnetic contactor connected between the first node and the output terminal, being rendered conductive during the first operation mode, and being rendered non-conductive during the second operation mode, and a semiconductor switch connected in parallel with the electromagnetic contactor and being rendered conductive for a predetermined period of time in response to the first operation mode being selected during the second operation mode.

7. The power supply apparatus according to claim 1, wherein the converter is configured to convert AC power of a commercial frequency which is supplied from a commercial AC power supply to DC power and output the DC power to the first node, when the AC power is supplied from the commercial AC power supply, the bidirectional chopper, the switch circuit, the first controller, and the second controller perform a mode selected from the first operation mode and the second operation mode, and during a power failure when a supply of the AC power from the commercial AC power supply is stopped, the switch circuit is configured to establish a non-conductive state between the first node and the second node and connect the second node to the power storage apparatus, the first controller is configured to cause the converter to stop operating, and the second controller is configured to control the bidirectional chopper such that the DC voltage of the output terminal attains to the first reference voltage.

* * * * *